United States Patent [19]

Galantino

[11] Patent Number: 4,902,866
[45] Date of Patent: Feb. 20, 1990

[54] APPARATUS FOR MIXING GASES FOR USE IN ARC WELDING PROCESSES

[76] Inventor: Carlo Galantino, 3097 Old Sonoma Rd., Napa, Calif. 94558

[21] Appl. No.: 229,580

[22] Filed: Aug. 8, 1988

[51] Int. Cl.⁴ .............................................. B23K 9/16
[52] U.S. Cl. ...................................... 219/74; 219/136
[58] Field of Search ...................... 219/74, 136, 137 R

[56] References Cited

U.S. PATENT DOCUMENTS

| | | | |
|---|---|---|---|
| 2,053,417 | 9/1936 | Brace | 219/74 |
| 2,727,125 | 12/1955 | Muller | 219/74 |
| 2,932,721 | 4/1960 | Kooistra | 219/74 |
| 3,089,944 | 5/1963 | Mathews | 219/74 |
| 4,154,999 | 5/1979 | Pinfold et al. | 219/74 |
| 4,645,903 | 2/1987 | DeVito et al. | 219/74 |
| 4,749,841 | 6/1988 | Galantino et al. | 219/137 PS |

*Primary Examiner*—Clifford C. Shaw
*Attorney, Agent, or Firm*—Townsend and Townsend

[57] ABSTRACT

An improved gas mixing apparatus for dispensing a specific ratio of two or more gases mixed together for supplying the mixture to a gas metal arc welding machine. The mixing apparatus provides gas mixing while welding operations are being performed. The apparatus includes a gas flow path defined by a pair of Y members coupled together to receive three different gases, the Y members being coupled with fittings and contained with the fittings in a housing which is relatively small in size and which is sufficiently small to be mounted on the side of a cylinder or on the side or top of a welding machine. The apparatus has no moving parts and it can be used with short arc, spray arc, pulse spray arc and gas tungsten arc processes. No adjustments of the parts of the mixing apparatus are necessary. There are no tools needed to change from one gas to another. A handle is provided for hanging the apparatus on a cylinder. A quick release reverse flow prevention valve is installed on the apparatus for each gas directed to the mixing apparatus.

12 Claims, 2 Drawing Sheets

APPARATUS FOR MIXING GASES FOR USE IN ARC WELDING PROCESSES

This invention relates to improvements in arc welding processes and, more particularly, an improved gas mixing apparatus for dispensing gases for use in gas metal arc welding processes.

BACKGROUND OF THE INVENTION

Gas metal arc welding processes are well-known and have been used for a number of years. Typically, a gas arc welding machine is provided with gases, such as helium, argon and carbon dioxide and such gases are premixed at a filling plant and supplied in a cylinder for use at a job site where a welding process is to be performed.

The main problem with this premixing technique is that either the gases were not properly mixed together at the filling plant or the gases undergo stratification in the cylinder. Thus, the mixture is not dispensed with the required ratio of gases. A proper welding process cannot be assured and can not be repeatable and reliable in all applications.

Because of these problems, a need exists for improvements in the delivery of a specific ratio of gases to a gas metal arc welding machine to assure repeatability and reliability in all applications. The present invention satisfied this need.

SUMMARY OF THE INVENTION

The present invention provides an improved gas mixing apparatus for dispensing a specific ratio of two or more gases mixed together for supplying the mixture to a gas metal arc welding machine. The mixing apparatus of the present invention provides reliable gas mixing while welding operations are being performed.

The apparatus of the present invention includes a gas flow path defined by a pair of Y members coupled together to receive three different gases, the Y members being coupled with fittings and contained with the fittings in a housing which is relatively small in size and which is sufficiently small to be mounted on the side of a cylinder or on the side or top of a welding machine. The apparatus has no moving parts and it can be used with short arc, spray arc, pulse spray arc and gas tungsten arc processes. No adjustments of the parts of the mixing apparatus are necessary. There are no tools needed to change from one gas to another. A handle is provided for hanging the apparatus on a cylinder. A quick release reverse flow prevention valve is installed on the apparatus for each gas directed to the mixing apparatus. Stainless steel mesh filters are also a part of the system.

The primary object of the present invention is to provide an improved gas mixing apparatus which can produce a mixture of two or three gases in the proper proportions to sustain the arc of a gas metal arc welding process yet, the mixing apparatus is highly reliable in operation, has no moving part and requires no adjustments, once the apparatus is assembled for use.

Other objects of the present invention will become apparent as the following specification progresses, reference being had to the accompanying drawings for an illustration of the invention.

Figure 1:
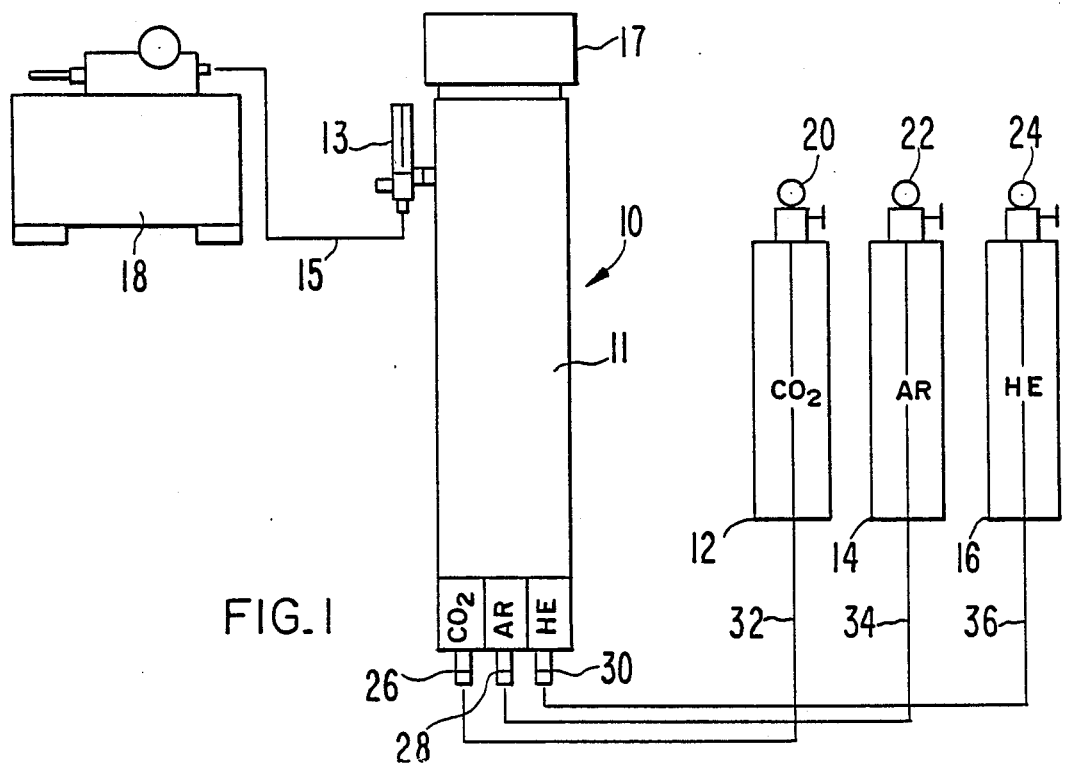
FIG. 1 is a schematic view of a system including a welding machine, a number of cylinders containing compressed gases to be used in operating the welding machine, and a mixer of the present invention for dispensing two or more gas mixes from the cylinders to the welding machine during an arc welding process.

The gas mixing apparatus of the present invention is broadly denoted by the numeral 10 and is adapted to be used with gas cylinders 12, 14 and 16 for mixing the different gases from the cylinders in a specific ratio, and then directing the mixed gases to a welding machine 18 capable of carrying out a gas metal arc welding process. The mixing apparatus 10 operates to control the flow or pressure of the gases by the use of fixed orifices and pressure snubbing compressed gas fittings as hereinafter described.

The cylinders 12, 14 and 16, are the sources of the gases to be used to operate welding machine 18 are conventional in construction and are of the non-premixed type. Cylinder 12 contains carbon dioxide; cylinder 14 contains argon; and cylinder 16 contains helium. These gases are to be mixed in certain proportions in mixing apparatus 10 for a flow therefrom to welding machine 18 at a specific ratio to sustain a gas arc during a welding operation.

Mixing apparatus 10 only mixes gases on demand from the use of the system shown in FIG. 1. The cylinders 12, 14 and 16 on their inlet ends have reverse flow prevention valves 20, 22 and 24, respectively. These valves will prevent gases from the respective cylinders from mixing apparatus 10 while apparatus 10 is idle.

Mixing apparatus 10 has inlet ports 26, 28 and 30, to allow gases from cylinders 12, 14 and 16, respectively, to be directed along lines 32, 34 and 36 into and through inlet ports 26, 28 and 30, respectively. Typically, the pressures of the gases as parts 26, 28 and 30 are in the ranges of 20 to 40 PSIG, preferably at 30 PSIG. The incoming gases will be reduced in pressure in flow through pressure snubbers and fixed orifice type compressed gas fittings to be described.

Figure 2:
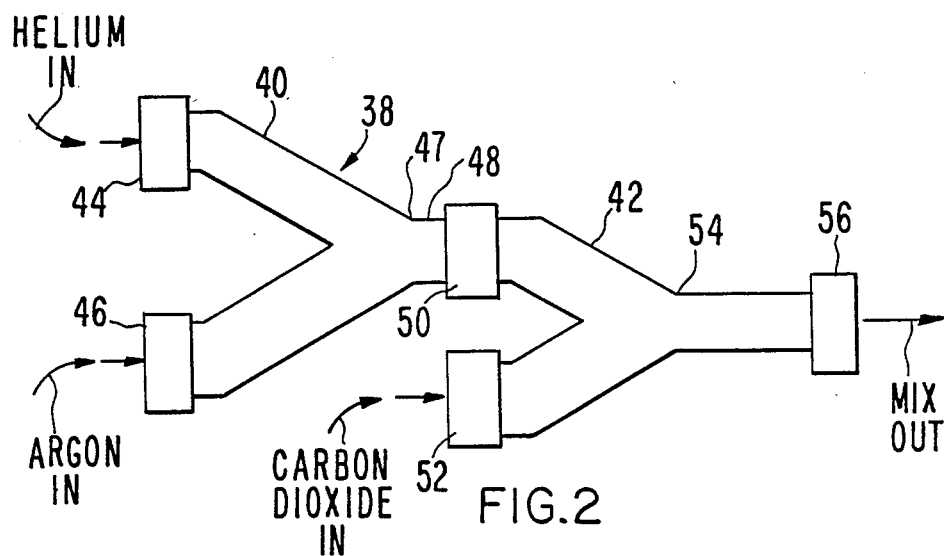
FIG. 2 is a schematic view of a pair of Y members forming parts of the mixing assembly of FIG. 1.

The mixing means in mixing apparatus 10 includes a double Y assembly 38 (FIG. 2) including a first Y member 40 and a second Y member 42 coupled to first Y member 40 in the manner shown in FIG. 2.

First Y member 40 has a pair of inlets 44 and 46 which are at the outer ends of a pair of arms which converge to a location 47 just upstream of the outlet 48 of first Y member 40. Outlet 48 is coupled to a first inlet 50 of second Y member 42 which also has a second inlet 52. Inlets 50 and 52 are coupled by arms which converge toward each other to a location 54 just upstream of outlet 56 of second Y member 42.

For purposes of illustration, helium is directed to the inlet 44 and argon is directed to inlet 46 of first Y member 40. The two gases unite and are mixed together at location 47 at the common point of the two converging arms of Y member 40.

The mixture at location 47 flows into second Y member 42 and mixes with incoming carbon dioxide gas directed into inlet 52 of second Y member 42. The three gases are mixed at location 54 of second Y member 42 and the mixture flows through the outlet 56 of second Y member 42.

The Y members 40 and 42 are coupled together with a total of approximately 33 compressed gas fittings of specific dimensions and types. These fittings have no moving parts, are pre-calibrated, or pre-drilled machined parts for gas flow control.

Gas mixing apparatus 10 is designed to accurately and consistently mix two or three of the above process gases for use in welding operations performed on carbon steels, stainless steel and nickel based alloys. The cylinder gases of cylinders 12, 14 and 16 will always be pure argon, helium and carbon dioxide going into mixing apparatus 10 through ports 26, 28 and 30.

In the practice of past welding techniques, when welding with premixed cylinder gases, either the gases were not mixed correctly at the filling plant or the gases had gone into stratification in the cylinders. It has been found that, upon developing a simple mixing means, such as mixing apparatus 10, it assures that a welding process is and can be repeatable and reliable in all applications. Thus, the apparatus 10 can produce a two, or three gas mixture for use with pulsed gas metal arc welding processes.

The use of the apparatus 10 is remarkable in that adjustments are not necessary. Welding stainless steels and low alloy steels with the pulse spray process is easily done in any welding position. Mixing apparatus 10 also offers a gas for short circuiting transfer on sheet metal, and spray arc transfer is easily achieved with yet another gas mix from the unit.

Figure 3:
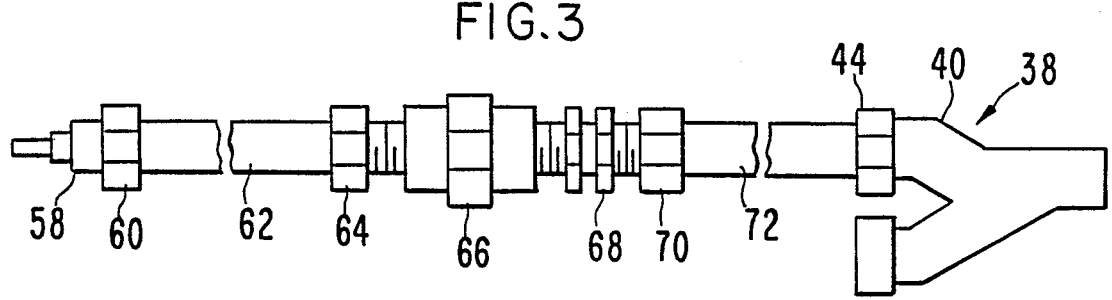
FIG. 3 is a view similar to FIG. 2 but showing the fitting on one inlet of a first Y member of the mixing assembly.
Figure 3A:
FIG. 3A is a side elevational view of a fitting having an orifice therethrough.

The fittings attached to the first and second Y members 40 and 42 are shown in FIGS. 3-6. The fittings inlet 44 of first Y member 40 includes the following fittings: A reverse flow check valve 58 with a quick disconnect unit thereon; a hose nut 60, a ¼" plastic hose 62; a ⅜" inert arc fitting 64; a ⅜" to ¼" coupler 66; a fixed flow adapter 68 with an orifice 69 (FIG. 3A). Its orifice diameter is about 0.018"; ⅜" inert arc fitting 70; a ¼" plastic hose 72. First Y member is a 9/16"×3" long Y unit.

Figure 4:
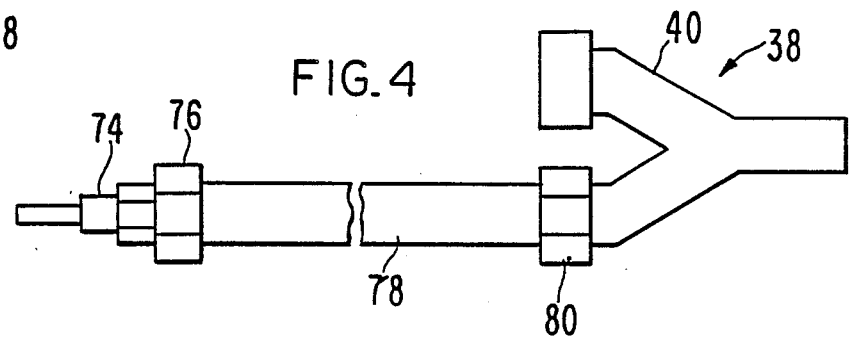
FIG. 4 is a view similar to FIG. 3 but showing the fittings connected to the other inlet of the first Y member.

On the argon side of mixing apparatus 10, as shown in FIG. 4, the fittings include a reverse flow check valve 74 with quick disconnect; a 9/16" hose nut 76; a ¼" plastic hose 78; a 9/16" hose nut 80 and nut 80 is coupled to inlet 46 of first Y member 40.

Figure 5:
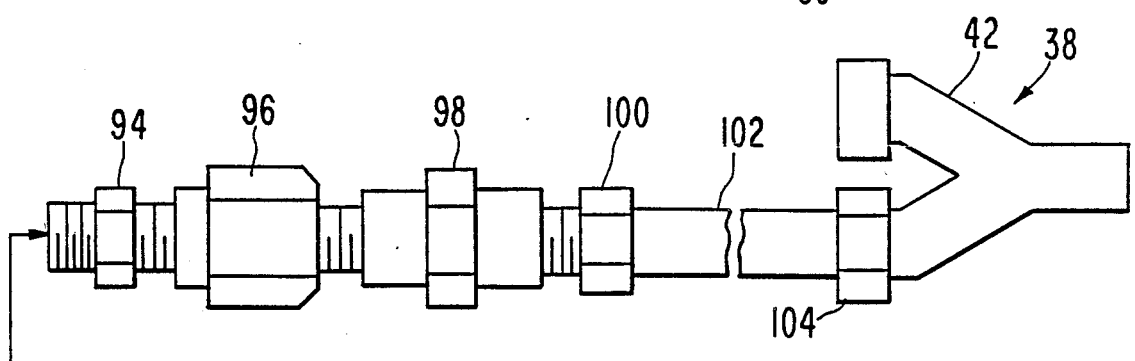
FIG. 5 is a view similar to FIGS. 3 and 4 but showing the fittings for an inlet of the second Y member of the mixing apparatus.
Figure 6:
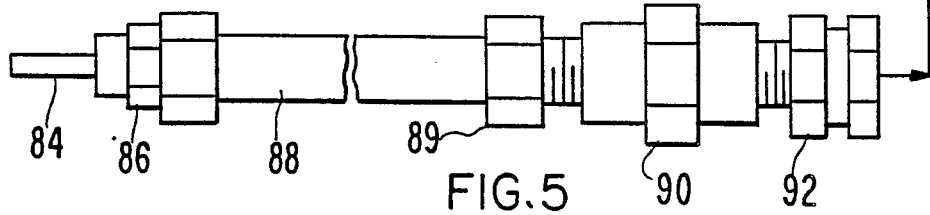
FIG. 6 is a view similar to FIGS. 3-5 but showing the fittings connected to the outlet end of the second Y member.

The fittings associated with the inlet 52 of second Y member 42 are shown in FIG. 5 and include the following: a reverse flow check valve 84 with a quick disconnect; a 9/16" hose nut 86; a ¼" plastic hose 88; a ⅜" inert arc fitting 89; a ⅜" to ¼" coupler 90; a fixed flow adapter 92 with an orifice (0.010" orifice diameter); a ¼" to ⅜" bushing 94; a pressure snubber 96 (0.0004" mean, 0.0009" max.); a ¼" to ⅜" coupler 98; a ⅜" inert arc fitting 100; a ¼" plastic hose 102; and a 9/16" hose nut 104.

Second Y member is 9/16"×3" long.

The outlet 56 of second Y member 40 includes a 9/16" coupler 106; a 9/16" hose nut 108; a ¼" plastic hose 110 and a ⅜" inert arc fitting 112.

In setting up the system of FIG. 1, a mixing means 38, including Y members 40 and 42, and the respective fitting shown and described in respect to FIGS. 3-6 are placed in an elongated housing 11 whose inlet ports 26, 28 and 30 are coupled with lines 32, 34 and 36 respectively. Gas pressure regulators 20, 22 and 24 are installed on cylinders 12, 14 and 16 and hoses 32, 34 and 36 are coupled from regulators 20, 22 and 24 at the respective ports 26, 28 and 30. A flow meter 13 is coupled to the outlet of mixing apparatus 10 and a gas hose 15 connects regulator 13 to welding machine 18. A handle or bale 17 is on one end of housing 11 to mount the housing on a cylinder.

In operation, the gas flow is started from the cylinders 12, 14 and 16 and each regulator 20, 22 and 24 is preset for preferably 30 pounds pressure PSIG. Then, the flow meter 13 is adjusted to the recommended flow of 35 to 45 cubic feet per hour. The check valves associated with ports 26, 28 and 30 prevent gas back flow in the system.

The housing 11 can be of any suitable size; however, it typically is in the range of 22" long, 4" wide and 2" deep. It is made of ⅛" carbon steel rectangular tubing. It has end walls which are welded in place in final assembly.

Helium is directed to inlet 44 and argon into inlet 46 of first Y member 40 with the two gases mixed at location 47. Helium is at a lower flow rate than the argon flow rate. Argon flowing into region 47 will mix with the helium and then the mix of helium and argon will flow into inlet 50 of second Y member 42. Carbon dioxide will simultaneously be directed into inlet 52 and will be mixed with the helium and argon mixture at an extremely low flow rate. The three gases will properly mix and continue as a mixture out of apparatus 10 for flow downstream to supply the welding arc.

The system of FIG. 1 can be described in detail as to operation with reference to the following examples:

EXAMPLE 1

In this example, the helium gas is not supplied to apparatus 10 and the mixture flowing through flow meter 13 includes, by volume, 95% argon and 5% carbon dioxide. The application of this mixture is gas metal arc welding - pulse spray transfer, and the material that can be welded for this application is carbon steel. In another application, namely a standard spray transfer, the materials that can be welded are stainless steel and carbon steel.

EXAMPLE 2

In this example, the carbon dioxide hose 32 is placed in the helium port with the helium off. At this condition, the mixture supplied to the welding machine 18 is, by volume, 85% argon and 15% carbon dioxide. In a gas metal arc welding, namely a short arc, the materials capable of being welded are carbon steel (sheet metal) up to 3/16" plates.

EXAMPLE 3

In this example, a standard pulse spray mix is provided, using all three gases in the following percentages by volume: 69-81% argon, 20-29% helium and 1-4% oxygen. The application for gas metal arc welding is pulse spray transfer for welding stainless steel and low alloy steel.

EXAMPLE 4

With carbon dioxide off, a mixture, by volume of 65% argon and 35% helium is supplied to welding machine 18. The application is for spray transfer of metal gas arc welding and the material that can be involved in this manner are aluminum alloys, bronze and coppers. In another application using this example, gas tungsten arc welding can be achieved with welding of stainless steel and aluminum alloys.

I claim:

1. Apparatus for mixing gases for use in sustaining the arc of a gas metal arc welding process comprising:
   an elongated housing having a pair of opposed ends;
   means adjacent to one end of the housing for defining a number of gas inlet ports adapted to be coupled to respective sources of gases;
   means in said housing and coupled with the ports for mixing the gases supplied thereto from said sources, said mixing means including a pair of Y members, each Y member including a pair of inlets and an outlet, the outlet of one of the Y members being coupled to an inlet of the other Y member, there being a number of fittings between each inlet port and the inlet of the corresponding Y member, said mixing means having an outlet adapted to be coupled to a welding machine, whereby the mixture of gases from said mixing means can be directed to the welding machine to sustain the arc of a gas metal arc welding process performed by the machine.

2. Apparatus as set forth in claim 1, wherein the inlets of said one Y member are coupled to two of the three ports, the third port being coupled to the other inlet of the other Y member.

3. Apparatus as set forth in claim 1, wherein the fittings of at least one of the Y members include a fixed flow adapter having an orifice.

4. Apparatus as set forth in claim 3, wherein the diameter of the orifice is in the range of 0.005" to 0.020".

5. Apparatus as set forth in claim 1, wherein the fittings coupled to each Y member include a one way check valve for each inlet port, respectively.

6. Apparatus as set forth in claim 1, wherein the housing has a shiftable handle adjacent to the opposite end of the housing for mounting the housing on a support.

7. In combination:
   a number of gas cylinders having respective fluid outlets, the gases adapted for use in sustaining the arc of an arc welding process;
   means coupled to the cylinders and adjacent to one end of the housing for defining a number of gas inlet ports adapted to be coupled to the outlets of respective cylinders;
   an elongated housing having a pair of opposed ends;
   means in said housing coupled with the ports for mixing the gases supplied thereto from said cylinders in predetermined proportions, said mixing means having an outlet adapted to be coupled to a welding machine, whereby the mixture of gases from said mixing means can be directed to the welding machine to sustain the arc of a gas metal arc welding process performed by the machine; and
   said mixing means including a pair of Y members, each Y member including a pair of inlets and an outlet, the outlet of one of the Y members being coupled to an inlet of the other Y member, there being a number of fittings between each inlet port and the inlet of the corresponding Y member.

8. Apparatus as set forth in claim 7, wherein the inlets of said one Y member are coupled to two of the three ports, the third port being coupled to the other inlet of the other Y member.

9. Apparatus as set forth in claim 7, wherein the fittings of at least one of the Y members include a fixed flow adapter having an orifice.

10. Apparatus as set forth in claim 9, wherein the diameter of the orifice is in the range of 0.005" to 0.020".

11. Apparatus as set forth in claim 7, wherein the fittings of each Y member include a one way check valve for each inlet port, respectively.

12. Apparatus as set forth in claim 11, wherein the housing has a shiftable handle adjacent to the opposite end of the housing for mounting the housing on a cylinder.

* * * * *